United States Patent [19]
Filimonov

[11] Patent Number: 5,909,857
[45] Date of Patent: Jun. 8, 1999

[54] FILIMONOV HYBRID DIRIGIBLE CRAFT

[76] Inventor: Alexandr Iosifovich Filimonov, 625010, Minscaya str. 10, ap.605, Tyumen, Russian Federation

[21] Appl. No.: 09/057,216

[22] Filed: Apr. 8, 1998

Related U.S. Application Data

[63] Continuation of application No. PCT/RU96/00284, Oct. 7, 1996.

[30] Foreign Application Priority Data

Oct. 31, 1995 [RU] Russian Federation ............ 95117921

[51] Int. Cl.$^6$ ...................................... B64B 1/02
[52] U.S. Cl. .......................... 244/29; 180/127; 244/12.3; 244/100 A; 244/23 R
[58] Field of Search .................. 244/12.1, 12.2, 244/12.3, 23 R, 23 C, 23 B, 30, 29, 25, 100 A, 101; 180/124, 127, 128

[56] References Cited

U.S. PATENT DOCUMENTS

| | | | |
|---|---|---|---|
| 2,567,392 | 9/1951 | Naught | 244/23 C |
| 2,736,514 | 2/1956 | Ross | 244/23 C |
| 3,512,603 | 5/1970 | Crewe et al. | 180/124 |
| 4,083,425 | 4/1978 | Rickards | 180/127 |
| 4,131,175 | 12/1978 | Wheeler | 180/127 |
| 4,333,413 | 6/1982 | Davis et al. | 180/127 |
| 4,606,515 | 8/1986 | Hickey | 244/23 C |

FOREIGN PATENT DOCUMENTS

| | | | |
|---|---|---|---|
| 1457774 | 9/1966 | France | 244/23 C |
| 645069 | 9/1962 | Italy | 244/12.2 |
| 2012511 | 5/1994 | Russian Federation | 244/12.1 |
| 1109561 | 4/1968 | United Kingdom | 244/23 R |

*Primary Examiner*—Galen L. Barefoot
*Attorney, Agent, or Firm*—Michael N. Meller

[57] ABSTRACT

The hybrid dirigible craft belongs to the category of flying vehicles which use an air cushion and take off and land at any type of airfield. The air of the invention is to design an improved dirigible craft capable of taking off from and landing on water and low-load bearing surfaces. To that end, the hybrid dirigible craft comprises the following elements: a discoid body (1) with a central passage (2) in which is mounted to a flow-permitting body (5) with a rotor (6) on its upper part and secured to the walls by radial partitions (7) which have an aerodynamic profile, the pilot-passenger and cargo compartments (9 and 10, respectively); a propulsion unit with propellers (8), units for landing on an air cushion in the form of an inflatable toroidal bag (11) and wheel-skid supports (12, 13) mounted on the lower surfaces; rotating flaps (3) mounted at the inlet into the central passage (2); control and stabilizing elements (4) mounted at the outlet of the central passage (2); outer wing units (14) and a tail assembly with stabilizer (19) and two or more fins (17) mounted on the rear part of the hull; airflow flaps (21) on the rear flaps of the outer wing elements and hull (22); and airflow control surfaces (20) on the stabilizer and outer wing elements. The dirigible craft also has elevons (22) on the stabilizer and a flexible guard element (23) mounted on and underneath the forward part of the toroidal bag (11). It also has a gear for taking off from water including gliding surfaces (28) underneath the compartment (9) and a hydrofoil (30).

8 Claims, 4 Drawing Sheets

FILIMONOV HYBRID DIRIGIBLE CRAFT

This is a continuation of PCT/RU96/00284 filed Oct. 7, 1996.

FIELD OF INVENTION

This invention relates to the field of aviation, namely to flying vehicles which use an air cushion and take off and land at any types of airfields or even if there is no airfield. To be more precise it relates to hybrid dirigible crafts.

The hybrid dirigible craft relates to flying vehicles with a combined principle of flying and can be used for lifting and transporting heavy and big size cargo.

STATE OF THE ART

A hybrid dirigible craft is known (see "Technical molodezhi" Magazine, No 2, 1987; Patent of France No 2366989, B 64 B I/06, 1976) comprising a discoid body with a central passage in which is mounted a flow-permitting body with a rotor on its upper part and secured to the walls by radial partitions which have an aerodynamic profile, pilot-passenger and cargo compartments, draft propulsion units.

However the given dirigible craft is observed to lack stability and controllability in the process of flying as well as on land and this results in the aggravation of service properties of this dirigible craft.

Another known dirigible craft (see Application RF No 92012238/II (0575 81), B 64 B I/06, 1992) comprises a discoid body with a central passage in which is mounted a flow-permitting body with a rotor on its upper part secured to the walls by radial partitions which have an aerodynamic profile, pilot-passenger and cargo compartments, a propulsion unit with propellers, units for landing on an air cushion in the form of an inflatable toroidal bag and wheel-skid supports mounted on the lower surfaces, rotating flaps mounted at the inlet of the central passage, control and stabilizing elements mounted at the outlet of the central passage, outer wing units and a tail assembly with a stabilzer and two or more fins mounted on the rear part of the hull, airflow flaps mounted on the rear flaps of the outer wing elements and the hull, airflow control surfaces mounted on the stabilizer and the outer wing elements.

A disadvantage of the given dirigible craft is the lack of stability and controllability when flying as well as when taking off and landing particularly on water and low-load bearing surfaces: snow, marsh, etc., and this results in the aggravation of service properties of the dirigible craft.

SUMMARY OF THE INVENTION

The object of the present invention is to develop a dirigible craft with better service properties which allow to perform taking off and landing on water and low-load bearing surfaces.

To solve this task the hybrid dirigible craft comprising a discoid body with a central passage in which is mounted a flow-permitting body with a rotor on its upper part secured to the walls by radial partitions which have an aerodynamic profile, pilot-passenger and cargo compartments, a propulsion unit with propellers, units for landing on an air cushion in the form of an inflatable toroidal bag and wheel-skid supports mounted on the lower surfaces, rotating flaps mounted at the inlet of the central passage, control and stabilizing elements mounted at the outlet of the central passage, outer wing units and a tail assembly with a stabilizer and two or more fins mounted on the rear part of the hull, airflow flaps mounted on the rear flaps of the outer wing elements and the hull, airflow control surfaces mounted on the stabilizer and the outer wing elements; also has elevons on the stabilizer and a flexible guard element mounted on and underneath the forward part of the WO toroidal bag. It also has gear for taking off from water in the form of gliding surfaces underneath the pilot-passenger compartment and the hydrofoil in the rear part of the hull; and the flexible guard is a cone-type skirt made of dense fabric with pockets in which in radial direction is additionally mounted resilient cuirasses with rollers and braids with the ends secured to the lateral walls of the toroidal bag.

This construction allows to increase the controllability of the proposed dirigible craft because the elevons function as an aileron—a transverse control surface and an elevator. The equipment of the dirigible craft with the elements in the form of the gliding surface underneath the pilot-passenger compartment will allow to increase the stability when taking off from water and other low-load bearing surfaces because the abovementioned gliding element takes at this moment an inclined position of 3–5 degrees by the toroidal bag inflation and leans the rear part against it. While a flying vehicle is moving the gliding surface creates the lift which pushes the flying vehicle out of water and decreases its resistance. The mounting of the hydrofoil in the rear part of the hull creates when taking off from water an additional hydraulic lift and provides the transverse control by decreasing and increasing its angle of incidence. The equipment of the dirigible craft with the guard element, so called skirt, with the toroidal bag inflated will allow to restrict the air flow forward and aside and direct the air from the air cushion backward thus stabilizing the vehicle on its course line when it is moving near the land and creating an additional draft traction.

On the basis of the information available the aggregate of essential features of the claimed hybrid dirigible craft is not known from the state of the art and this allows to make a conclusion of the correspondence of the invention to the novelty criterion.

To the Applicant's opinion the subject of the claimed invention does not mainly result from the state of the a because it does not show up the abovementioned influence upon the achieved technical result—a new property of the object—the aggregate of the features which differ the claimed hybrid dirigible craft from a prototype and this allows to make a conclusion of its correspondence to the invention level criterion.

The aggregate of essential features characterizing the essence of the invention can have multiple application in the manufacture of flying vehicles with a combined principle of flying with obtaining the increase of stability and controllability when taking off and landing on water and low-load bearing surfaces that allows to make a conclusion of the correspondence of the hybrid dirigible craft to the industrial application criterion.

BRIEF DESCRIPTION OF DRAWINGS

Further the invention is explained throughout the description of a specific example of its embodiment and the following drawings are given in which.

BEST EMBODIMENT OF INVENTION

Figure 1:
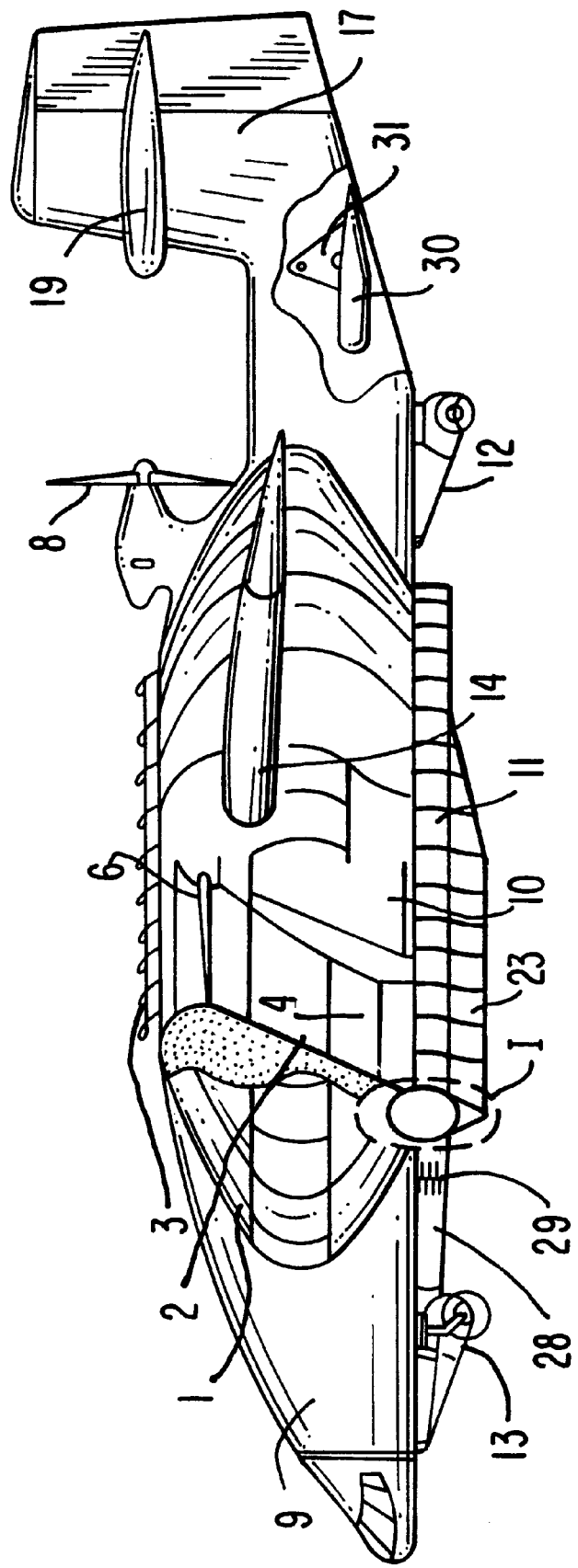
FIG. 1 is a schematic view of the hybrid dirigible craft.
Figure 2:
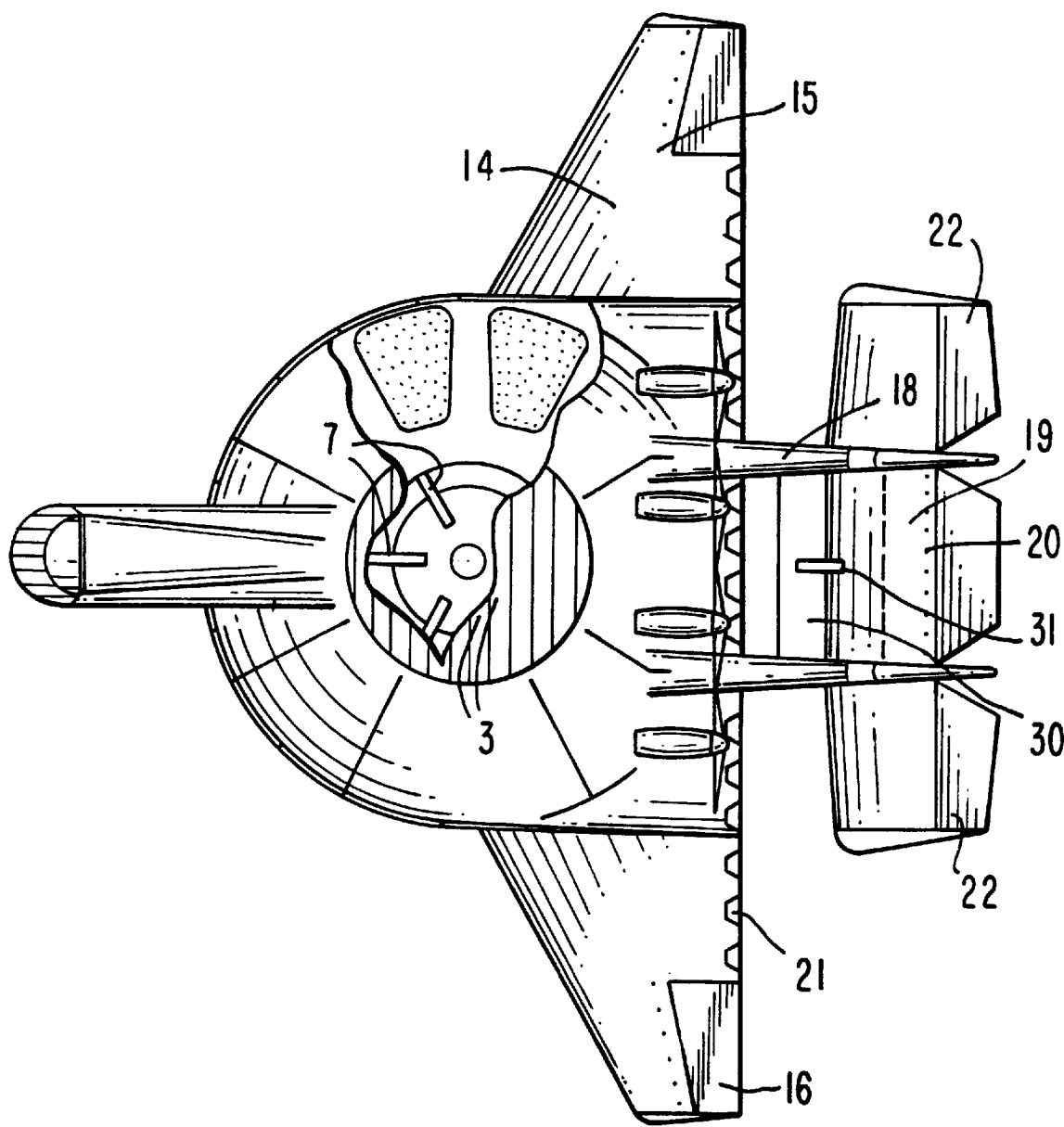
FIG. 2 is a view in plan of the dirigible craft.
Figure 3:
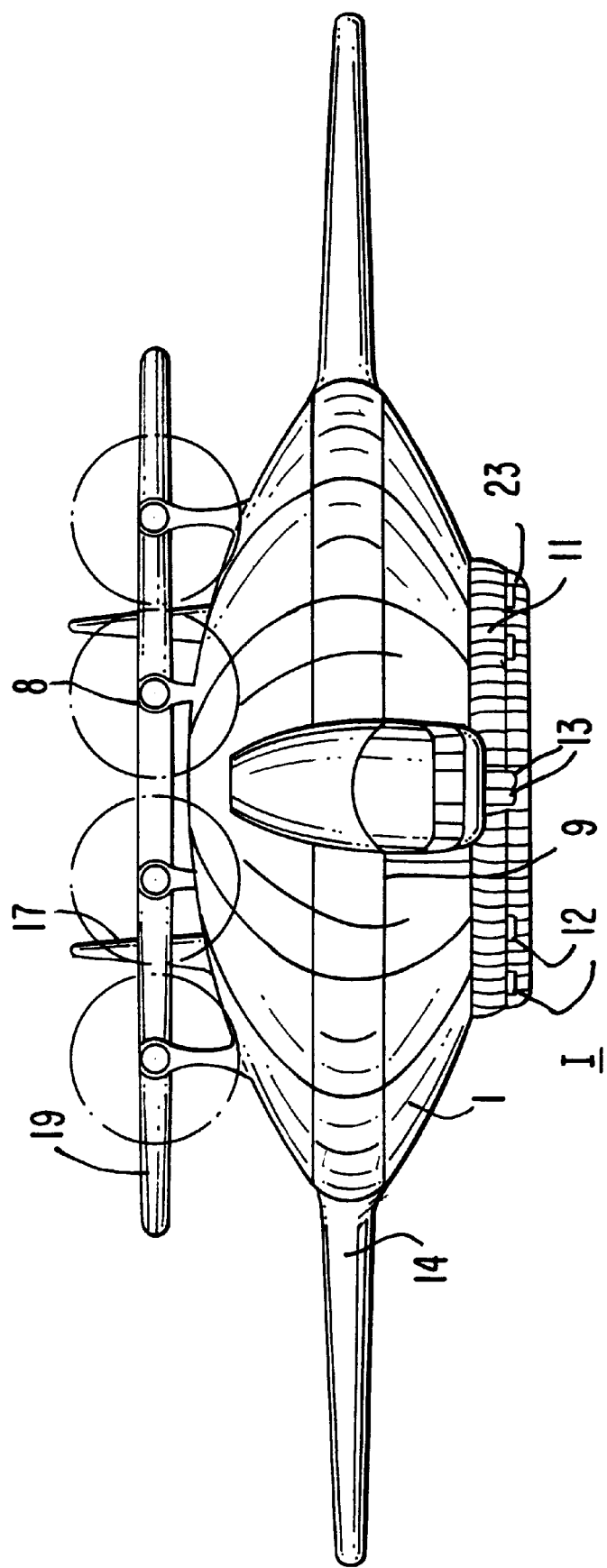
FIG. 3 is a front view.
Figure 4:
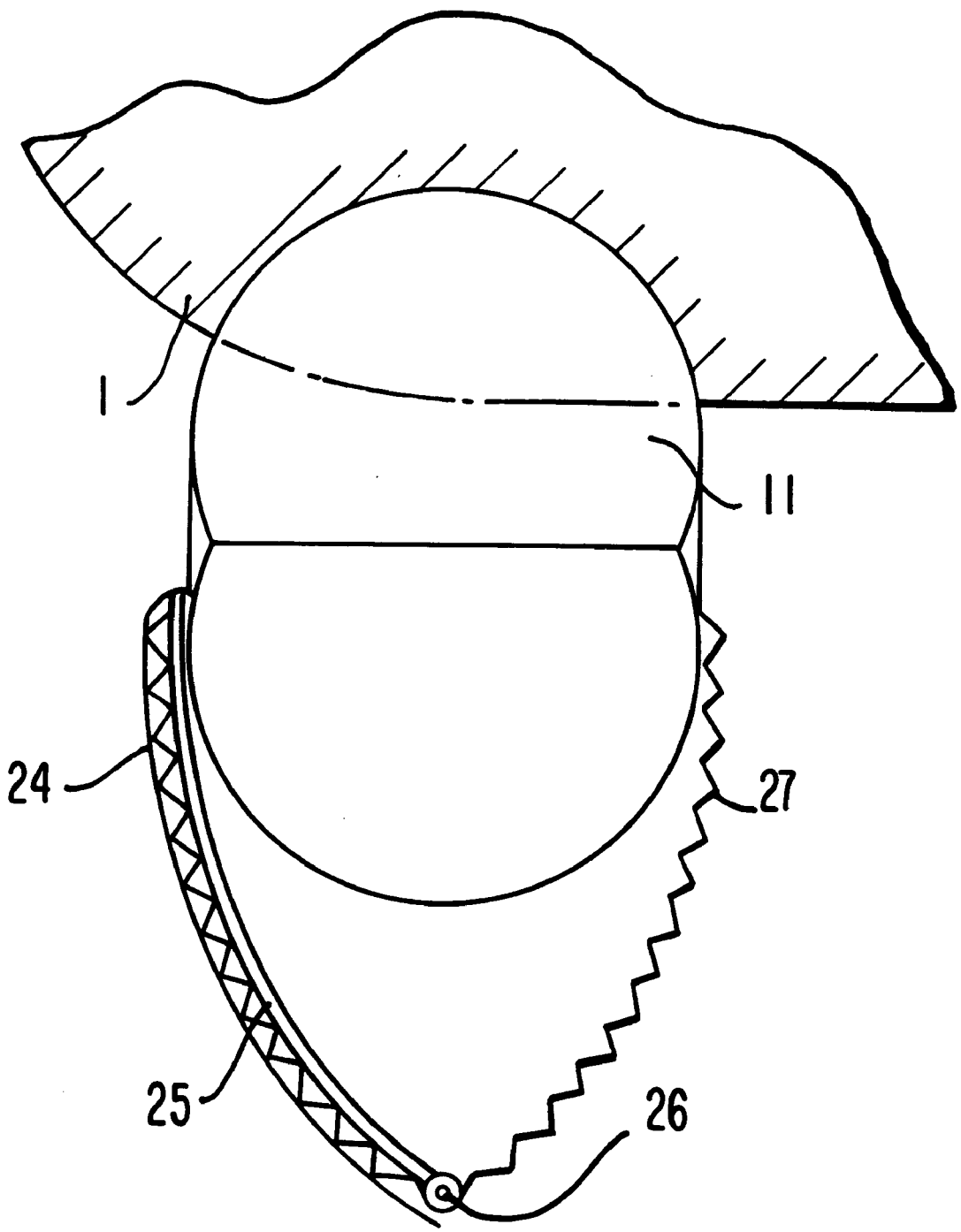
FIG. 4 is a flexible guard.

A hybrid dirigible craft comprises a discoid body 1 with a central passage 2 in which are mounted rotating flaps 3 at the inlet, control and stabilizing elements 4 at the outlet of the central passage, and in which is mounted a flow-permitting body 5 with a rotor 6 on its upper part secured to the walls by radial partititions 7 which have an aerodynamic profile, a propulsion unit with propellers 8, a pilot-passenger compartment 9 and a cargo compartment 10, units for landing on an air cushion in the form of a toroidal bag 11 and wheel-skid supports 12 and 13 mounted on the lower surfaces, outer wing units 14 with airflow transverse control surfaces 15 and ailerons 16 on their ends, a tail assembly with two fins 17 mounted on tail beams 18 and stabilizers 19 with an airflow longitudinal control surface 20, airflow flaps 21 mounted on the rear flaps of the outer wing elements and the hull. On the lateral sections of the stabilizer are mounted elevons 22 which simultaneously function as an aileron—a transverse control surface and an elevator. Underneath the foward part of the toroidal bag 11 is mounted a flexible guard element 23. The flexible guard is made in the form of a cone-type skirt 24 made of dense fabric, to diameter of the skirt in radial direction in the pockets are mounted resilient cuirasses 25 with rollers 26 on the end. Over the roller is thrown a rubber braid 27 the ends of which are secured to the lateral walls of the toroidal bag 11. The skirt is located on the forward sector of the bag, 180 degrees and more, with its height decreasing towards the rear sector. Underneath the pilot-passenger compartment 9 is mounted a gliding surface 28 which forward part is hinged to the lower surface of the compartment, and rear part leans against the inflated toroidal bag 11 with a simultaneous spring loading with tension springs 29. Between the tail beams 18 underneath the rear part of the body 1 is mounted a hydrofoil 30 which is hinged to the tail beams and equipped with a lever 31 by means of which via the control wiring (not shown) the hydrofoil is controlled from the pilot-passenger compartment.

The elevons 22 work as follows:

During taking off or landing especially on low-load bearing surfaces due to the blow-out of airflows a tilting moment takes place. The airflow transverse control surfaces 15 and the ailerons 16 are not enough to supress this moment. For dampening the abovementioned moment the lateral sections of the elevators are deflected simultaneously upwards and downwards as ailerons. Being blown by the propellers 8 they create a necessary transverse moment (for supressing the tilting moment).

When the toroidal bag is inflated the flexible guard 23 restricts the flow of air forward and aside and directs the air from the air cushion backward thus stabilizing a flying vehicle on its course line during its travel near the land. It is the cuirasses 25 and the braids 27 that gives the skirt the rigidity and form. When the toroidal bag is deflated the skirt via the rubber braids 27 is automatically pressed against the torus which also is pressed by its rubber braids (not shown).

When taking off form water and other low-load bearing surfaces the gliding surface 28 takes an inclined position (3–5 degrees) and leans its rear part against it. When a flying vehicle is travelling the gliding surface creates the lift pushing the flying vehicle out of water and decreasing its resistance. After taking off when the toroidal bag is deflated the gliding surface via the springs 29 is automatically pulled up to the lower part of the pilot-passenger compartment without creating an additional aerodynamic resistance during the flight. When taking off from water the hydrofoil 30 creates an additional hydraulic lift and by decreasing and increasing its angle of incidence the longitudinal control is provided. The angle is changed via the application of control forces to the lever 31. Upon taking off and during travelling the hydrofoil can function as an element for longitudinal balancing of a flying vehicle.

INDUSTRIAL APPLICATION

The proposed hybrid dirigible craft is a stable and controllable during the flight as well as during taking off and landing on hard and low-load bearing surfaces owing to better controllability of the dirigible craft, by making the elevons function as ailerons. The gliding surface underneath the pilot-passenger compartment increases the stability during taking off from low-load bearing surfaces and water.

The calculations and tests that have been made show a high level of flight performance of the hybrid dirigible craft implemented in accordance with the present invention.

The Table given below comprises the technical data of the hybrid

TABLE

| Description | Data |
|---|---|
| Gross weight, t | 350 |
| Cargo/passenger, t/pers. | 200/800 |
| Flight velocity, km/h | 200 |
| Flight altitude, m | 3000 |
| Flight range, km | 3000 |
| Specific fuel consumption, kg/hp h | 0.2 |
| Construction, t | 100 |
| Length, m | 145 |
| Span, m | 140 |
| Height, m | 40 |
| Area in plan, sq m | 500 |
| Air cushion area, sq m | 600 |
| Wing load, kg/sq m | 50 |
| Specific soil pressure, kg/sq m | 75 |
| Power to weight ratio, hp/kg | 0.16 |
| Engines | Th-114 (AH-22) |
| Take-off run, m | 100 |
| Runway | soil, water, ice, marsh |
| Traction, t | 60 |

I claim:

1. A hybrid dirigible craft comprising a discoid body (1) with a craft central passage (2) in which is mounted a flow-permitting body (5) with a rotor (6) on its upper part secured to the walls by radial partitions (7) which have an aerodynamic profile, a pilot-passenger compartment (9) and a cargo compartment (10), a propulsion unit with propellers (8), an inflatable toroidal bag (11) suspended below said craft and having a forward part and a rearward part with the bag being inflated to provide an air cushion for landing said craft and wheel-skid supports (12 and 13) mounted on the lower surfaces of the craft, rotating flaps (3) mounted at the inlet of the central passage (2), control and stabilizing elements (4) mounted at the outlet of the central passage, outer wing units (14) and a tail assembly with a stabilizer (19) and two or more fins (17) mounted on the rear part of the hull, airflow flaps (21) mounted on the rear flaps of the outer wing elements and the hull, airflow control surfaces (15) mounted on the stabilizer and the outer wing elements, wherein elevons (22) are mounted on the stabilizer and a flexible guard element (23) is mounted on and underneath the forward part of the toroidal bag (11) so that the flexible guard envelops the perimeter of the toroidal bag over at least 180 degrees thereof and has a configuration so that its height decreases from the forward part of the toroidal bag to the rearward part thereof for restricting the flow of air both forward and aside of said craft and for directing the airflow from the toroidal bag backward for the purpose of stabilizing the craft during take-off and landing.

2. A hybrid dirigible craft according to claim 1 wherein the gear for taking off from water comprises a gliding surface (28) mounted underneath the pilot-passenger compartment (9) and a hydrofoil (30) mounted at the rear part of the hull.

3. A hybrid dirigible craft according to claim 1 wherein the flexible guard has a skirt (14) in the configuration of a cone.

4. A hybrid dirigible craft according to claim 3 wherein the flexible guard skirt is made of dense fabric.

5. A hybrid dirigible craft according to claim 3 wherein the skirt is made with pockets in which in radial direction is additionally mounted resilient cuirasses (25) with rollers (26) and braids (27) with the ends secured.

6. A hybrid dirigible craft according to claim 5 wherein the braids are made of rubber fabric.

7. A hybrid dirigible craft according to claim 5 wherein the braids are made of rubberized fabric.

8. A hybrid dirigible craft according to claim 5 wherein the ends of the braids are secured to the lateral walls of the toroidal bag (11).

\* \* \* \* \*